United States Patent
White

(10) Patent No.: US 6,999,748 B2
(45) Date of Patent: Feb. 14, 2006

(54) AUTOMATED DEVICE BEHAVIOR MANAGEMENT BASED ON NETWORK CHARGING AND RATING CONDITIONS

(75) Inventor: Christopher White, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 220 days.

(21) Appl. No.: 10/324,354

(22) Filed: Dec. 19, 2002

(65) Prior Publication Data

US 2004/0203584 A1  Oct. 14, 2004

(51) Int. Cl.
*H04M 11/00* (2006.01)
*H04M 15/00* (2006.01)

(52) U.S. Cl. .............. 455/406; 455/408; 455/414.1; 379/111; 379/114.03

(58) Field of Classification Search ............ 455/405, 455/406, 407, 408, 411, 414.1, 418, 419, 455/420; 379/111, 114.01, 114.03, 114.05, 379/114.06, 114.09, 114.1, 114.12, 130

See application file for complete search history.

(56) References Cited

U.S. PATENT DOCUMENTS

| | | | | |
|---|---|---|---|---|
| 5,794,140 A | * | 8/1998 | Sawyer | 455/408 |
| 5,799,072 A | * | 8/1998 | Vulcan et al. | 379/114.02 |
| 5,970,403 A | * | 10/1999 | Alperovich et al. | 455/406 |
| 5,974,308 A | * | 10/1999 | Vedel | 455/407 |
| 6,532,284 B1 | * | 3/2003 | Walker et al. | 379/144.06 |
| 6,564,047 B1 | * | 5/2003 | Steele et al. | 455/405 |
| 6,577,717 B1 | * | 6/2003 | Henon | 379/114.01 |
| 6,622,017 B1 | * | 9/2003 | Hoffman | 455/419 |
| 2002/0045441 A1 | * | 4/2002 | Ralston et al. | 455/418 |
| 2002/0107000 A1 | * | 8/2002 | Goss et al | 455/405 |
| 2002/0183051 A1 | * | 12/2002 | Poor et al. | 455/418 |
| 2004/0043763 A1 | * | 3/2004 | Minear et al. | 455/419 |
| 2004/0123147 A1 | * | 6/2004 | White | 713/201 |
| 2004/0132438 A1 | * | 7/2004 | White | 455/418 |
| 2004/0132449 A1 | * | 7/2004 | Kowarsch | 455/432.1 |
| 2004/0142682 A1 | * | 7/2004 | Kamiya et al. | 455/418 |

* cited by examiner

Primary Examiner—Binh K. Tieu
(74) Attorney, Agent, or Firm—Perkins Coie LLP

(57) ABSTRACT

Disclosed embodiments include a method for automatically managing wireless device actions based on network provider-controlled financial conditions, such as the current rate (e.g., cents/minute) for a voice or data communication. In one embodiment, the user configures preferences indicating how the device should behave based on certain financial conditions. The device and the provider communicate transparently to the user to monitor current financial conditions and take actions automatically based on the user preferences. The provider communicates current financial conditions, and the device takes actions according to the user preferences, including executing downloaded applications on the device.

43 Claims, 6 Drawing Sheets

AUTOMATED DEVICE BEHAVIOR MANAGEMENT BASED ON NETWORK CHARGING AND RATING CONDITIONS

RELATED APPLICATIONS

The present application is related to U.S. application Ser. No. 10/324,494 filed on Dec. 19, 2002, U.S. application Ser. No. 10/324,159 filed on Dec. 19, 2002, and U.S. application Ser. No. 10/324,870 filed Dec. 19, 2002, all commonly assigned to Cingular Wireless II, LLC and incorporated by reference in their entirety.

BACKGROUND

The disclosed embodiments relate to automatic wireless communication device awareness of current conditions related to network charges and rates ("financial conditions"), and user-defined device behavior based on those conditions. The disclosed embodiments give a wireless device user greater automatic control over how rating and charging conditions affect device use.

Users of wireless communication devices agree on rating and charging terms in a service provider agreement. The network service provider, or carrier, typically offers a variety of plans with different variables. The variables include the amount of air time per billing cycle that is charged at a minimum rate, more favorable rates during "off-peak" times such as nights and weekends (as opposed to "on-peak" or "peak") times, different rates for on-network use and roaming use, fees for special services such as call conferencing and email usage, etc. The amount of time available per billing cycle at a certain rate is sometimes referred to as the amount of time in a "bucket". For example, the user typically chooses a number of minutes per month, e.g., 100 minutes per month, that are free or charged at a minimal rate. After the 100 bucket minutes are used, airtime is charged, or is charged at a higher rate.

Users benefit from having an awareness of how much money they will spend if they use their device at a certain time or in a certain way. For example, the user might like to know that only five minutes are left in the bucket. This rating and charging awareness is even more important with data connections than with voice connections. For example, sending or receiving email during peak hours may be much more expensive than during off-peak hours. For the user to adjust device usage based on rating and charging conditions, however, the user currently must affirmatively: 1) find out what the conditions are; 2) act or refrain from acting accordingly. For example, for some devices, the user can press keys on the keypad to find out how many minutes are left in the bucket.

Currently, the ability to automatically manage device use based on financial conditions is very limited, and also costly and awkward. For example, if a user wishes for an action be taken based on a condition, such as having particular phone numbers disabled under certain conditions, this is currently handles on an occurrence-by-occurrence basis at the provider site. The provider must program a local provider application to recognize that the device belonging to the particular account is making a particular call when a specified condition is current. The provider must then invoke a native application on the device, such as the call controller, to disable the specified phone numbers. This has several limitations and disadvantages. The user must make a written or verbal request to the provider. The provider must assign someone to program the provider application, and activities of the affected device must be monitored, which slows call handling. The provider can only invoke native applications, not downloaded applications, which limits the actions that can be taken in response to a condition.

Overall, there is a need for an improved ability to automatically manage wireless device behavior based on rating and charging conditions. There is a need to allow the wireless device user greater flexibility to automatically control device use with minimal provider intervention using all of the capability of the device, including the capabilities of downloaded applications.

DETAILED DESCRIPTION

Embodiments of the invention, described below, include a method for automatically managing wireless device actions based on network provider financial conditions, such as the current rate (e.g., cents/minute) for a voice or data communication. The financial conditions are typically agreed upon by the network provider and the user, but are controlled by the provider. The user configures preferences indicating how the device should behave based on certain financial conditions. Embodiments of the invention include storing data on the wireless device, on provider equipment or both, based on the preferences. The device and the provider communicate transparently to the user to monitor current financial conditions and take actions automatically based on the user preferences. Depending on the class of the device, communication and device behavior as described herein can occur during, or not during, a voice connection. In the latter case, the communication is queued until the voice connection is closed. The communication and behavior does not occur when the device is powered down.

In one embodiment, the user device includes native applications and downloaded applications. The downloaded applications could come from a variety of sources (vendors) and are individually configured by the user and/or the vendor. The provider may have no knowledge of the downloaded applications. Embodiments of the inventions, however, allow the user configuration to dictate which applications are automatically executed at particular times based on financial conditions, such that the provider does not need to be aware of downloaded applications on a device. The user configuration is applicable at an account level, making the user configuration automatically applicable to multiple devices on one account. The provider does not need to intercept or specially process calls in order to affect the device behavior. The provider only recognizes the condition and passes it to the device for processing.

Figure 1:
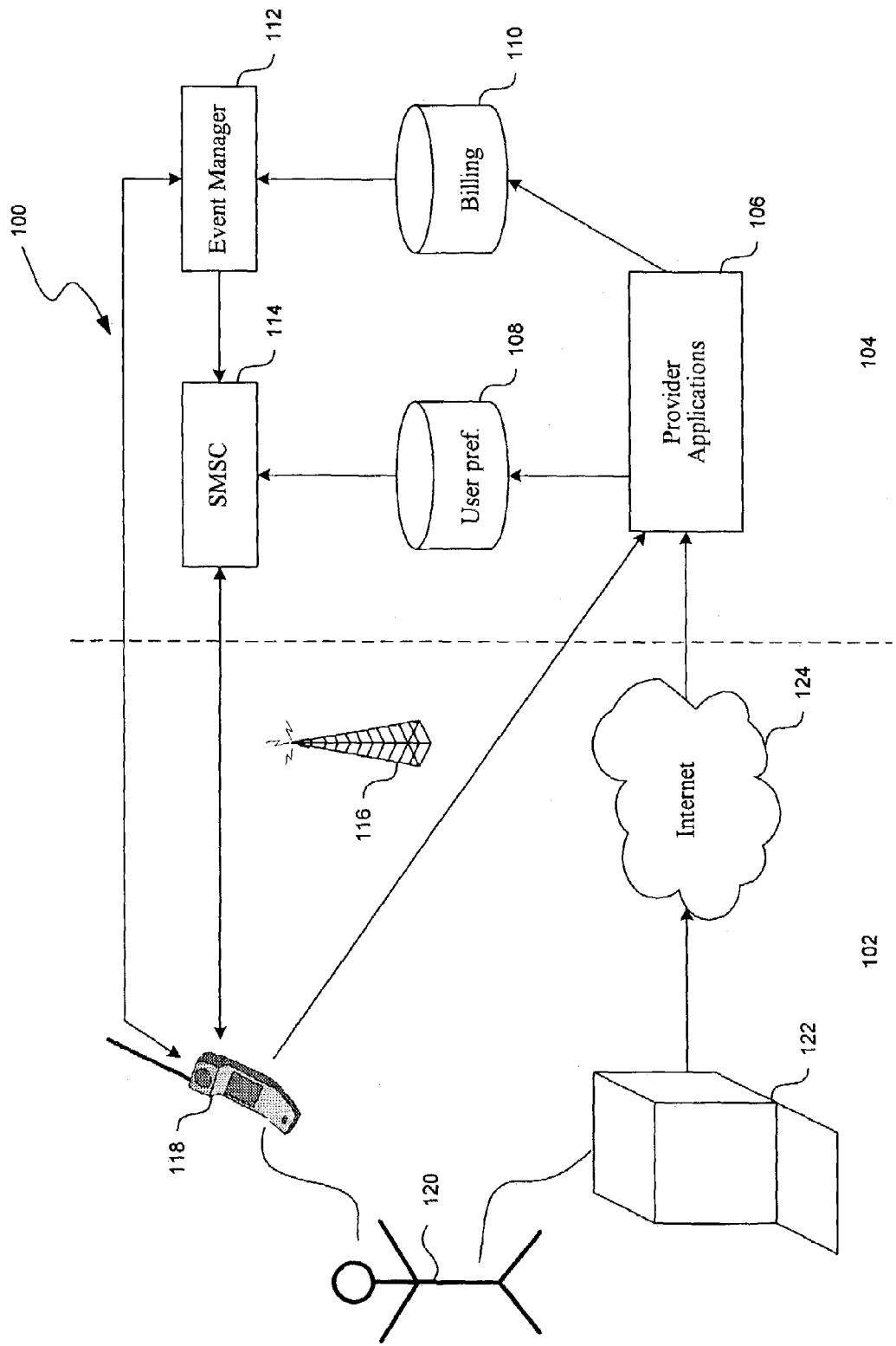
FIG. 1 is a diagram of an embodiment of a wireless communication system.

FIG. 1 is a diagram of an embodiment of a wireless communication system 100. The system 100 is arbitrarily divided into two areas. Area 104 includes equipment and applications ("provider equipment") typically provided and maintained by a wireless communication service provider, such as a cellular phone service provider. Area 102 includes equipment and applications (with the exception of radio tower 116) that are typically not provided or maintained by the provider, but are designed to communicate on the wireless network with the provider equipment. System 100 is an example of one arrangement of elements, but others are possible. A cellular phone service provider is one example of a provider, but other examples include any wireless service provider that provides wireless communication capabilities through a user device over a wireless network. For example, service providers that support personal digital assistants ("PDAs") are also providers for purposes of the embodiments described.

The area 104 includes various elements useful to illustrate embodiments. Many typically known elements of provider equipment are not shown because they do not add to the understanding of the embodiments. For example, various computers or data processors are not shown, but are known to be part of the provider equipment. Provider applications 106 are software applications that maintain and administer the network. For example, the applications 106 include billing applications, performance monitoring applications, and many more. The applications 106 include applications that track user accounts, which are typically designated by a responsible billing party. The account may include one user with one device, or a group of many users each with a respective device. For example, some enterprises provide groups of employees with devices for limited or unlimited use in the course of employment.

The area 104 further includes a database or databases 108 and 110. The databases 108 and 110 are shown separately to distinguish the types of data stored, but could be one physical entity or more than two physical entities. The database 110 is a billing database that stores data used by the provider to generate bills for an account. Billing data includes all of the information in the user's rate plan, such as number of minutes in a bucket, bucket rates, out of bucket rates, etc.

A user preferences database 108 stores a user's choices regarding what financial conditions the user would like the device to be automatically notified of. The user preference database also includes actions the user would like the device to take when a financial condition occurs. One example is the device automatically blocking all outbound calls upon during peak billing rate time.

A short message service controller ("SMSC") 114 manages short messaging, including receiving/sending, generating, and encoding/decoding SMS messages. The wireless communication device 118 communicates over the wireless network using radio towers such as radio tower 116 in the known manner. An event manager 112 recognizes events and sends a message to the SMSC in response. An event manager 112 recognizes events that indicate a change in the current financial condition (such as change from off-peak to peak) and sends a message to the SMSC in response.

A user 120 of a wireless communication device 118 may configure the user preferences by accessing a dedicated provider configuration application (one of the applications 106). The applications 106 may be accessed using the device 118, or using a personal computer 122 to access the application 106 via the Internet 124. The user preferences are developed by the provider configuration application based on user inputs and downloaded from the provider to the device 118. The device 118 includes downloaded applications (not shown in FIG. 1) that may come from the provider or any third party. Downloaded applications from the provider may be configured in the same way as preferences, as described. Downloaded applications from third parties may be configured in any way dictated by the third party source. The provider has no knowledge of the configuration of the third party downloaded applications or their individual configurations. The user 120, however, knows which downloaded applications are present on the device 118 and how they are configured to behave. The user 120 can therefore configure the user preferences accordingly. For example, the user may configure the user preferences such that a downloaded email application only sends or receives emails during an off-peak period.

Figure 2:
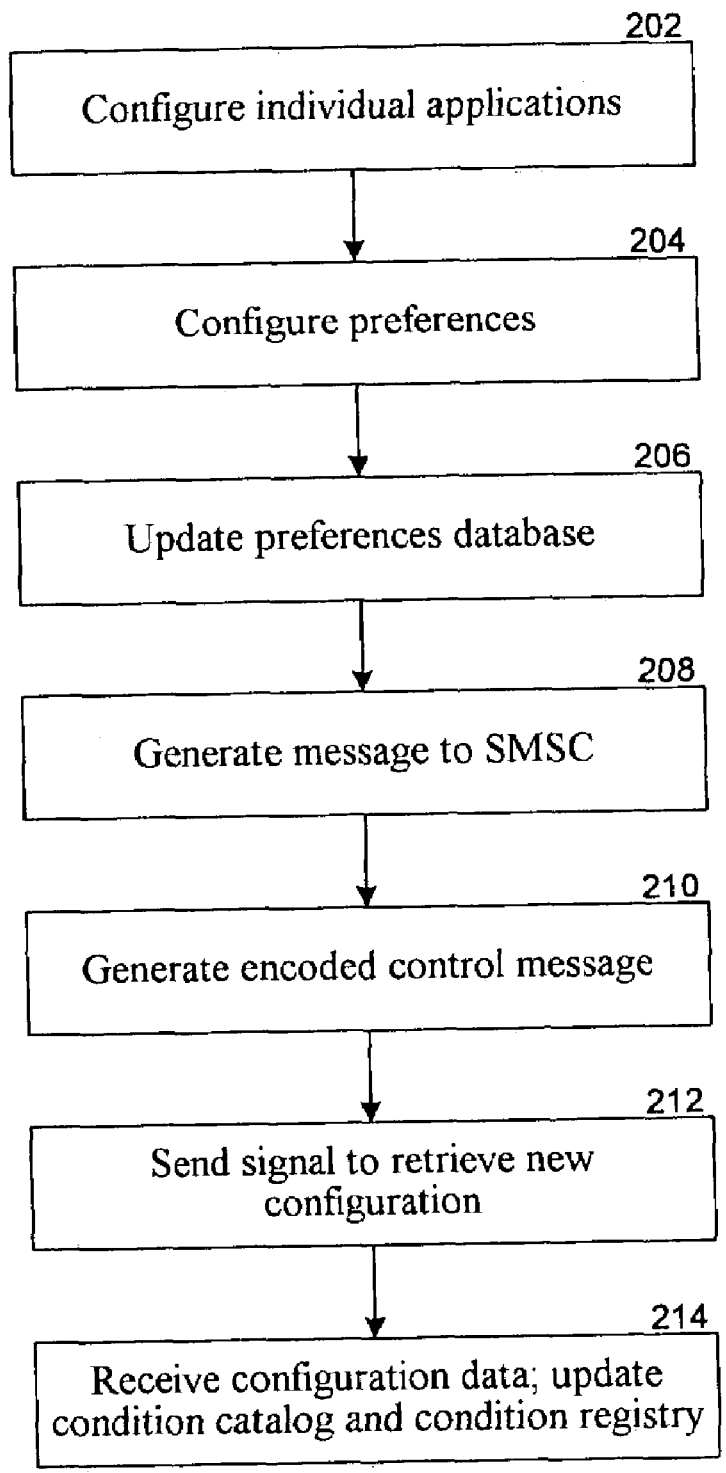
FIG. 2 is a flow diagram of one embodiment of device configuration.

FIG. 2 is a flow diagram illustrating an embodiment of the device 118 configuration. Referring to FIG. 1 and FIG. 2, at 202 the user individually configures the downloaded applications on the device 118. Then, the user configures the user preferences at 204, and the user preferences are stored (at 206) in the database 108. When a new user configuration is stored for an account, a message is sent to the short message service controller ("SMSC") 114 at 208. At 210, the SMSC 114 generates an encoded SMS message to the device 118 that indicates a new user configuration is available to be downloaded. At 212, the device 118 opens a communication channel to the provider equipment 104 to retrieve the new configuration data. In one embodiment, the encoded message reaches the device 118, indicating that the device 118 is receiving a general packet radio service ("GRPS") signal. In one embodiment, the condition "Home GPRS Available" is in the signal. The device 118 invokes a Java application management service ("JAMS", described further below), which looks for applications with a "Refresh when new data connection becomes available" flag set. The indicated applications start and perform data refreshes. The user need not take any actions. The new configuration data is received, and a condition catalog and a condition registry (described below) are updated at 214.

For the purpose of device 118 configuration, out-of-band signals are exchanged between the device 118 and the provider equipment, although in-band signaling could be used. These signals may be exchanged via a hypertext transfer protocol ("HTTP") connection, a wireless application protocol ("WAP") connection, or any other wireless communication method.

Figure 3:
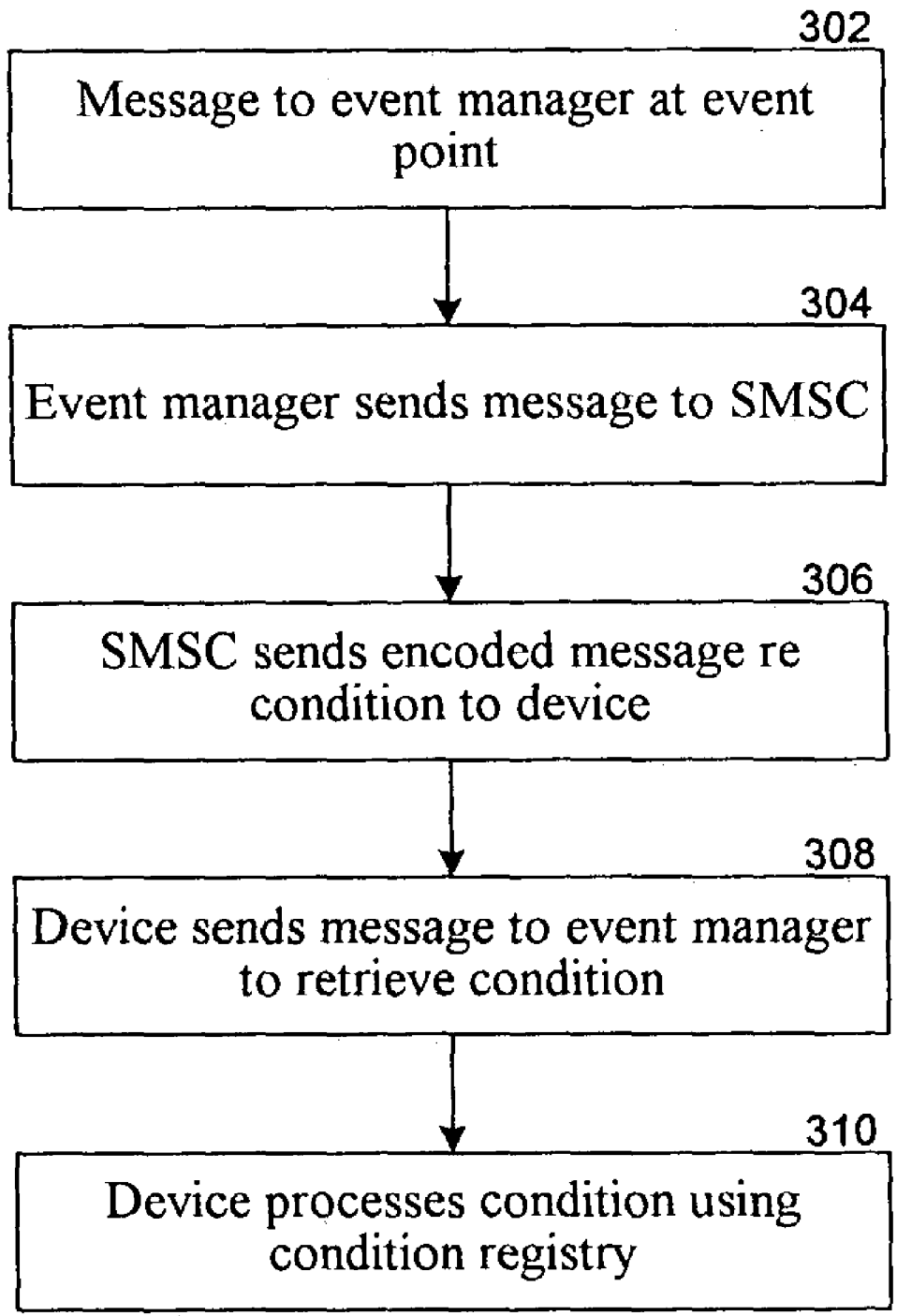
FIG. 3 is a flow diagram of one embodiment of remote application invocation.

FIG. 3 is a flow diagram illustrating an example of automatic conditional application invocation. Referring to FIG. 1 and FIG. 3, At 302, a message is sent to the event manager 112 to indicate that a new condition is becoming current. As one example, the billing database 110 sends a message to the event manager 112 indicating that the bucket is empty. At 304, the event manager 112 sends a message to the SMSC 114 requesting that an encoded message be generated. The SMSC encodes the message and sends it to the device 118 at 306. At 308, the device 118 receives and decodes the message, and sends a return message to retrieve the financial condition from the event manager 112. At 310, the device 118 receives the financial condition from the event manager 112 and processes the financial condition using a condition registry as described below. In an alternative embodiment, the SMS message sent to the device includes the financial condition. In this embodiment, therefore, the device does not retrieve the condition from the event manager 112.

Once the financial conditions and the conditions are available to the device, the device is able to make decisions based on the user-selected choices. One scenario is a user, Bob, writing an email to send to Tom. Bob's device is currently set to send email only during off-peak periods. The message thus queues in Bob's device, along with any other email he has written, until the network notifies the device of a rate change. When the device receives notification that rates have changed downward, the device wakes up the email application and sends out all mail in the queue.

Another scenario is Bob setting his email preferences to send and receive high-priority messages whenever they are generated. All other emails wait for the change to an off-peak period. Tom's email marked high-priority would be delivered immediately to the device. This represents a conscious choice made by the user, which can be changed at any time.

In yet another scenario, Tom wishes to limit the amount of time his son Billy can talk to certain people each month on his cellular phone. For example, Tom sets his preferences such that Billy can only talk to his best friend Sam for 60 minutes per month. Once Billy has reached that limit, the phone will no longer dial that number or accept incoming calls from that number. When the bill cycle completes, the phone will receive a new bucket message from the network and reset its counter for Sam's number. The limitation extends only to the numbers preselected by Tom. Calls to Tom, or Tom's wife, to 911, 611, or 311, would not be affected.

Figure 4:
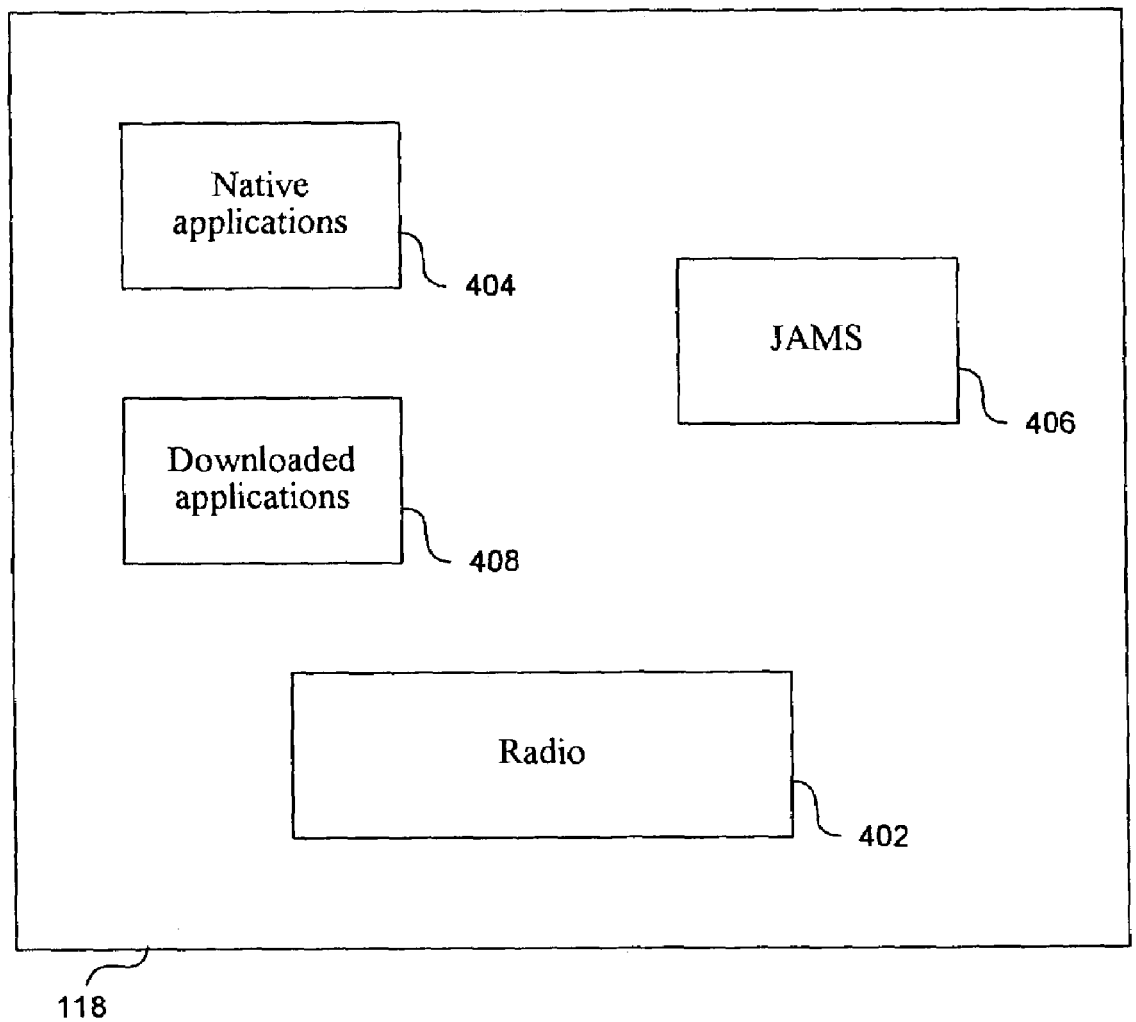
FIG. 4 is a diagram of an embodiment of a wireless communication device.

FIG. 4 is a block diagram of an embodiment of the device 118. The device 118 includes native applications 404, and downloaded applications 408. Radio 402 includes the hardware and software required to communicate over the wireless network. A JAMS 406 includes Java programs and Java program management capability. Many other known elements of the device 118, such as on-board processors and storage elements, are not shown.

Figure 5:
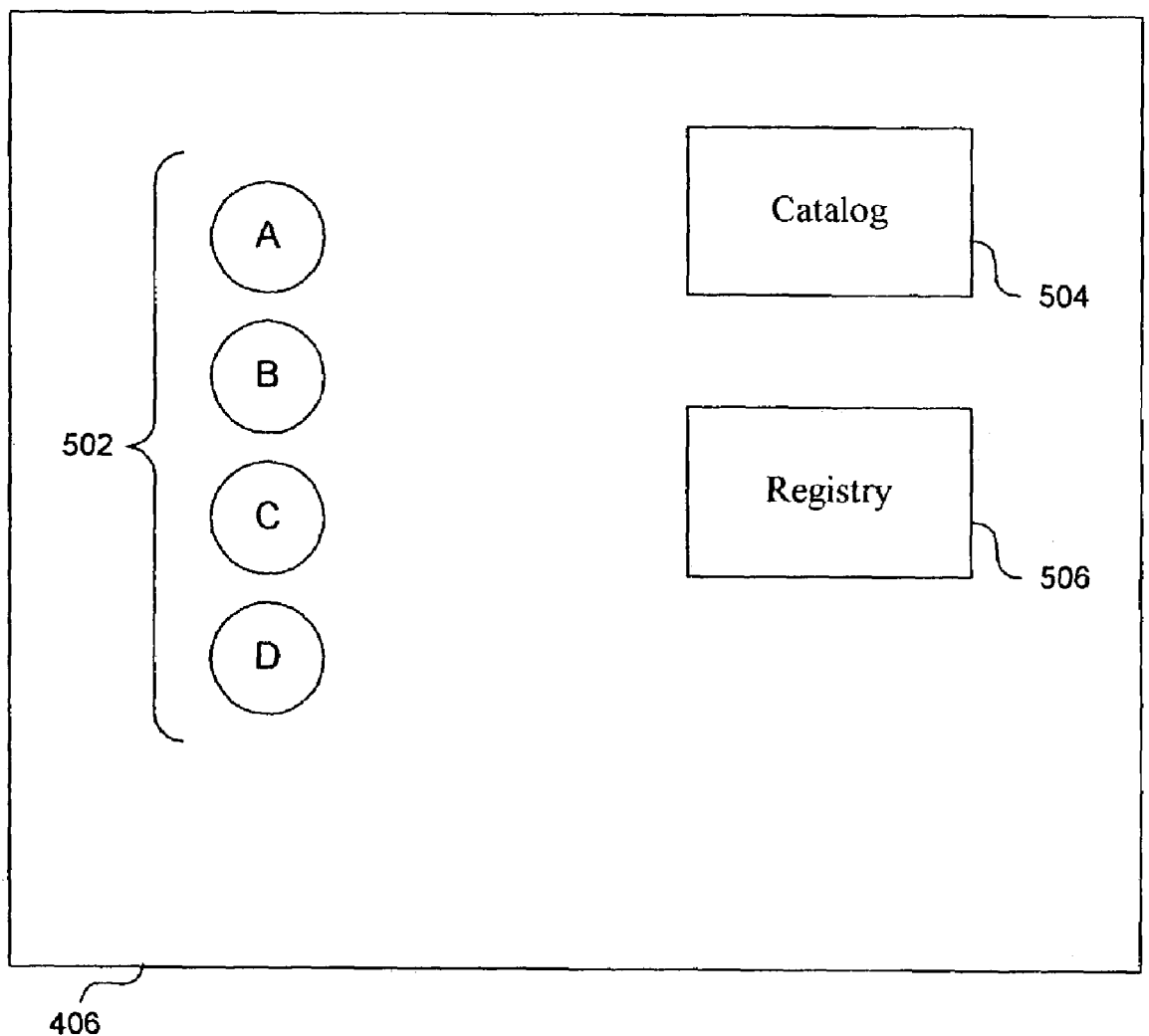
FIG. 5 is a diagram of an embodiment of a Java application management service ("JAMS").

FIG. 5 is a block diagram of the JAMS 406 in one embodiment. The JAMS 406 includes downloaded Java applications 502 designated A, B, C, and D. The number of downloaded Java applications shown is an arbitrary example. The actual number of downloaded Java applications stored can be greater or less than four, and is only limited by storage capacity. The JAMS 406 also stores a condition catalog 504 and a condition registry 506.

Figure 6:
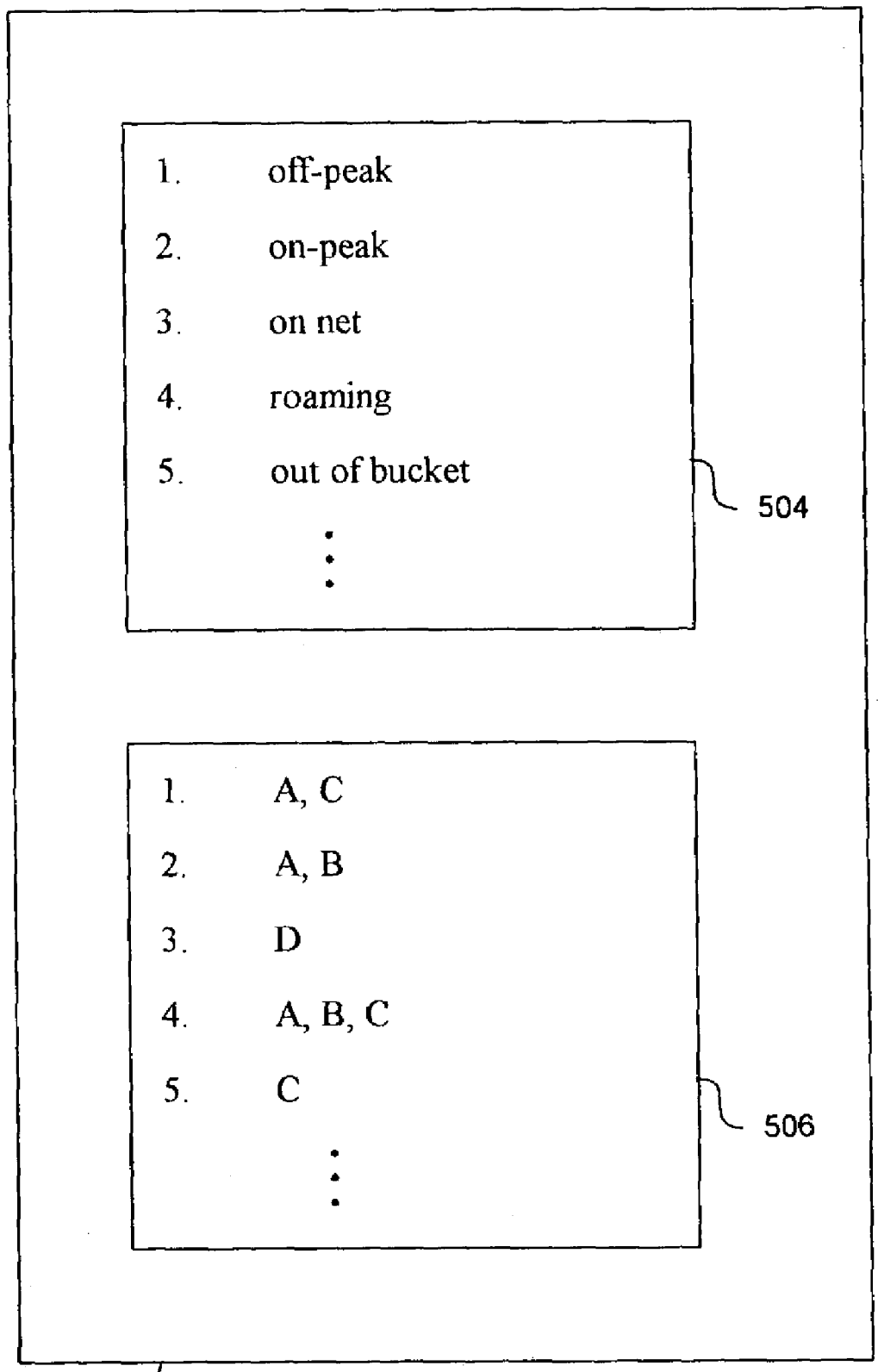
FIG. 6 is another diagram of an embodiment of a wireless communication device.

FIG. 6 is another block diagram of the JAMS 406 showing more detail of the condition catalog 504 and the condition registry 506. The condition catalog 504 includes a list of conditions recognized by the device 118. The condition catalog is populated when the user downloads new user preferences as previously described. Some examples of financial conditions are off-peak rate time, peak rate time, being on the network, roaming for service, and the bucket being empty. The conditions shown are a subset of possible conditions that can be recognized by the device 118. The condition registry 506 includes a list of the conditions recognized by the device 118 for each condition, and which downloadable Java applications (A, B, C, and/or D) should be executed when the condition occurs. For example, when condition 2 (peak rates are current) occurs, application A and B are executed. Application A may be an application that generates a user message that the transition is occurring, while application B may block outgoing calls automatically (subject to user override). In other embodiments, the applications listed in the condition registry include native applications as well as downloaded applications. In other embodiments, the condition catalog and condition registry do not reside on the JAMS, but reside elsewhere on the device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily only wireless communication system described herein. The various embodiments described herein can be combined to provide further embodiments.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A method for automatically managing wireless device actions based on network provider-controlled financial conditions, the method comprising:

receiving user preferences regarding device actions to be associated with a financial condition, wherein the financial condition relates to a current provider-imposed cost of using a wireless device, and wherein receiving user preferences includes receiving user specification of actions to be taken by the device when certain financial conditions are current;

updating configuration data in the device to reflect the user preferences, including storing the specified actions and associating the specified actions with the financial conditions;

sending a message to the device when one or more of the financial conditions becomes current; and the device automatically performing actions in response to the occurrence of the financial condition, including automatically executing one or more downloaded applications.

2. The method of claim 1, wherein automatically performing actions further comprises the device looking up the financial condition and looking up at least one application to be executed in response to the financial condition.

3. The method of claim 1, wherein the message sent to the device is an encoded short message service ("SMS") message that includes the financial condition.

4. The method of claim 1, wherein the message sent to the device is an encoded short message service ("SMS") message, and wherein the device responds to the message by opening a data connection to retrieve the financial condition.

5. The method of claim 1, wherein the certain financial conditions include:
a peak rate being current;
an off-peak rate being current;
a minute bucket being empty;
the wireless device means currently roaming for service;
the wireless device means currently on network; and
a start of a new billing period.

6. The method of claim 1, wherein the user preferences apply to one or more devices associated with a responsible billing party, such that each associated device automatically performs the same actions in response to an occurrence of a same financial condition, including automatically executing one or more downloaded applications.

7. A method for automatically managing wireless device actions based on financial conditions agreed with a wireless network service provider, the method comprising:
a wireless device receiving user preferences regarding actions to be taken by a device on an occurrence of a financial condition, wherein the financial condition relates to a current cost of using the device to communicate via a provider network;
the device updating configuration data in the device to reflect the user preferences;
the service provider sending a message to the device when the financial condition occurs; and
the device automatically performing actions in response to the occurrence of the financial condition, including automatically executing one or more downloaded applications, transparently to the user.

8. The method of claim 7, wherein updating the configuration data further comprises:
receiving a message from the provider indicating a change in user preference information;
initiating a data session with the provider;
retrieving preference information and updating data in the wireless device,
wherein the data in the wireless device includes financial conditions recognized by the device and applications to be executed in response to the financial conditions, wherein the applications include one or more downloaded application.

9. The method of claim 7, further comprising:
individually configuring the one or more downloaded applications, each of which has one or more supplier-dictated configuration procedures, including,
configuration through a device user interface;
configuration through a personal computer via the Internet; and
remote configuration by a supplier of the downloaded application through a data connection.

10. The method of claim 7, comprising:
notifying the device a financial condition is current; and the device responding by,
recognizing the financial condition; and
determining which of the one or more software applications is to be executed when the financial condition is current.

11. The method of claim 7, wherein the device responding comprises:
notifying the device a financial condition is current; and the device responding by,
accessing a condition catalog that includes conditions recognized by the device; and
accessing a condition registry that related conditions to actions to be taken by the device, wherein the condition catalog and the condition registry are populated according to the user preferences.

12. The method of claim 7, further comprising the user remotely accessing a network provider application to configure the user preferences.

13. The method of claim 7, wherein sending a message comprises encoding a short message service ("SMS") message.

14. The method of claim 7, wherein the financial condition comprises:
a peak rate being current;
an off-peak rate being current;
a minute bucket being empty;
the wireless device means currently roaming for service;
the wireless device means currently on network; and
a start of a new billing period.

15. A wireless communication system, comprising:
wireless communication provider equipment, comprising a storage device that stores provider software applications and data, including an event manager application and a short message service controller (SMSC) application;
a wireless communication device coupled to the provider equipment, comprising,
more than one software application, including native applications and downloaded applications, wherein the downloaded applications are individually configured by a wireless device user;
a condition catalog that stores a list of user-specified conditions related to a user's cost for communicating using the wireless device;
a condition registry that stores relationships between conditions and actions, wherein the wireless device receives notification that a condition is current from the provider equipment and automatically performs one or more actions using one or more software applications based on predefined user preferences.

16. The wireless communication system of claim 15 wherein:
the event manager is configured to recognize that a condition has become current and send a message to the SMSC: and
the SMSC is configured to generate an encoded SMS message to the wireless device that indicates the condition is current.

17. The wireless communication system of claim 15 wherein the wireless device is configured to:
receive an encoded SMS message from the SMSC indicating the condition is current;
determine from the condition registry which applications should be executed in response to the condition; and
execute the indicated applications.

18. The wireless communication system of claim 15, wherein the wireless device is configured to communicate with a provider software application for allowing the user to define the user preferences, wherein communication includes communication via the Internet.

19. The wireless communication system of claim 15, wherein the native applications include a call controller application.

20. The wireless communication system of claim 15, wherein the native applications include a call controller application and the downloaded applications include an email application, an address book application, a custom ring application, a game application, and a media application.

21. The wireless communication system of claim 15, wherein the provider is a wireless cellular phone service provider and the wireless device is a cellular phone, wherein the conditions comprise:
 a peak rate being current;
 an off-peak rate being current;
 a minute bucket being empty;
 the wireless device means currently roaming for service;
 the wireless device means currently on network; and
 a start of a new billing period.

22. A wireless mobile device, comprising:
 more than one application including native applications and downloaded applications;
 a list of conditions recognized by the device, wherein the conditions relate to wireless network provider charges for using the device on a wireless network;
 a list of relationships between the conditions and actions to be taken by the device, wherein the device is configured to receive a condition notification and take actions according to the list of relationships,
 wherein the actions comprise executing at least one of the downloaded applications.

23. The wireless mobile device of claim 22, wherein the list of conditions and the list of relationships are stored in a Java application management service (JAMS).

24. The wireless mobile device of claim 22, wherein the device is configured to communicate with the wireless network provider to allow a device user to configure preferences regarding the actions taken by the device in response to conditions.

25. The wireless mobile device of claim 22, wherein the device is configured to:
 communicate with the wireless network provider to allow a device user to configure preferences regarding the actions taken by the device in response to conditions;
 receive a signal from the provider indicating that preferences have been changed;
 in response to the signal, initiate communication with the provider; and
 retrieve new configuration information from the provider, including changes to the list of relationships and changes to the list of conditions.

26. The wireless mobile device of claim 22, wherein the device is configured to:
 receive an encoded message from the wireless network provide indicating that a condition has occurred;
 open a communication channel to the provider to retrieve the condition; and
 process the condition using the list of conditions and the list of relationships.

27. The wireless mobile device of claim 25, wherein the signal is an encoded short message service ("SMS") message, and wherein the new configuration information is retrieved via a general packet radio service ("GPRS") connection.

28. The wireless mobile device of claim 25, wherein the encoded message is an encoded short message service ("SMS") message, and wherein opening a communication channel includes establishing a connection chosen from a group comprising a hypertext transfer protocol ("HTTP") connection and a wireless application protocol ("WAP") connection.

29. The wireless mobile device of claim 22, wherein the user preference include:
 a preference that email messages be sent only during off-peak rate time, else that email messaged be queued in the wireless device;
 a preference that high priority emails be sent and received regardless of current conditions; and
 a preference that calls can be connected to certain phone numbers for a maximum amount of time per charging period.

30. A wireless communication system, comprising:
 a wireless communication network means administered by a carrier;
 a wireless device means that communicates with the carrier through a wireless network, wherein,
  the wireless device means comprises more than one software application, including native applications and downloaded applications;
  the wireless communication network means notifies the wireless device means of conditions, wherein conditions relate to provider charges for using the network; and
  the wireless device means responds by executing one or more of the software applications according to previously configured user preferences.

31. The wireless communication system of claim 30, wherein the wireless device means further comprises:
 a condition catalog means that includes conditions recognized by the wireless device means; and
 a condition registry means that related conditions to actions to be taken by the wireless device means, wherein the condition catalog means and the condition registry means are populated according to the user preferences.

32. The wireless communication system of claim 30, further comprising carrier-side equipment means including a carrier application remotely accessed by the user to configure the user preferences.

33. The wireless communication system of claim 30, further comprising carrier-side equipment means including an event manager means configured to send a message to the wireless device means when a predefined condition occurs.

34. The wireless communication system of claim 30, further comprising carrier-side equipment means, including:
 an event manager means configured to recognize a condition and generate a message; and
 a message controller means configured to receive the message and generate an encoded message to the wireless device means indicating the occurrence of the predefined condition.

35. The wireless communication system of claim 30, further comprising carrier-side equipment means, including:
 a carrier application remotely accessed by the user to configure the user preferences; and
 a storage means that stores the user preferences.

36. The wireless communication system of claim 30, wherein the condition comprises:
 an on-peak rate being current;
 an off-peak rate being current;
 the wireless device means currently to roaming for service;
 the wireless device means currently on network; and
 a pre-allotted amount of minimum rate airtime being exhausted.

37. A device-readable medium having instructions stored thereon, that when executed by a processor cause the processor to perform the method comprising:

notify a wireless device of a condition that relates to variable charges payable by a user of the device to a wireless network provider; and in response to the notification, execute one or more software applications on the wireless device according to previously configured user preferences, wherein the one or more software applications includes one or more downloaded applications individually configured by a user.

38. The device-readable medium of claim 37, wherein the responding to the notification comprises:

accessing a condition catalog that includes conditions recognized by the wireless device; and accessing a conditions registry that relates a conditions to actions to be taken by the wireless device, wherein the a condition catalog and the a condition registry are populated according to the user preferences.

39. The device-readable medium of claim 37, further comprising receiving data inputs from the user remotely accessing a network provider application to configure the user preferences.

40. The device-readable medium of claim 37, wherein notifying comprises sending a message to the wireless device when the a condition occurs.

41. The device-readable medium of claim 37, wherein notifying comprises:

a network provider event manager recognizing a condition and generating a message to a message controller; and the message controller generating an encoded message to the wireless device indicating the occurrence of the condition.

42. The device-readable medium of claim 37, further comprising:

receiving data input from the user remotely accessing a network provider application to configure the user preferences; and storing the user preferences in a user preferences database.

43. The device-readable medium of claim 37, wherein the condition comprises:

an on-peak rate being current;

an off-peak rate being current;

the wireless device means currently roaming for service;

the wireless device means currently on network; and a pre-allotted amount of minimum rate airtime being exhausted.

\* \* \* \* \*

UNITED STATES PATENT AND TRADEMARK OFFICE
CERTIFICATE OF CORRECTION

PATENT NO. : 6,999,748 B2  Page 1 of 1
APPLICATION NO. : 10/324354
DATED : February 14, 2006
INVENTOR(S) : Christopher White It is certified that error appears in the above-identified patent and that said Letters Patent is hereby corrected as shown below:

Column 9
Line 23, insert --and-- after "wireless network;";

Column 10
Line 25, insert --but not to load conditions on the network-- between "work;" and "and";

Column 11
Line 17, "relates a conditions" should be --relates conditions--;
Line 19, "a condition catalog and the a condition registry" should be --condition catalog and the condition registry--;
Line 27, delete "a";

Signed and Sealed this

Eighth Day of January, 2008

JON W. DUDAS
*Director of the United States Patent and Trademark Office*